(12) United States Patent
Zhang et al.

(10) Patent No.: US 8,758,947 B2
(45) Date of Patent: Jun. 24, 2014

(54) GRAPHENE-BASED BATTERY ELECTRODES HAVING CONTINUOUS FLOW PATHS

(75) Inventors: Jiguang Zhang, Richland, WA (US); Jie Xiao, Richland, WA (US); Jun Liu, Richland, WA (US); Wu Xu, Richland, WA (US); Xiaolin Li, Richland, WA (US); Deyu Wang, Ningbo (CN)

(73) Assignee: Battelle Memorial Institute, Richland, WA (US)

( * ) Notice: Subject to any disclaimer, the term of this patent is extended or adjusted under 35 U.S.C. 154(b) by 747 days.

(21) Appl. No.: 13/004,138

(22) Filed: Jan. 11, 2011

(65) Prior Publication Data

US 2012/0178001 A1 Jul. 12, 2012

(51) Int. Cl.
*H01M 8/22* (2006.01)
(52) U.S. Cl.
USPC ........... 429/405; 429/402; 429/403; 429/404; 429/406
(58) Field of Classification Search
USPC .................................................. 429/402–406
See application file for complete search history.

(56) References Cited

U.S. PATENT DOCUMENTS

| | | | | |
|---|---|---|---|---|
| 7,585,579 | B1* | 9/2009 | Read | 429/405 |
| 7,794,880 | B2* | 9/2010 | Yazami et al. | 429/231.7 |
| 2005/0175894 | A1 | 8/2005 | Visco et al. | |
| 2010/0081057 | A1 | 4/2010 | Liu et al. | |
| 2010/0143798 | A1 | 6/2010 | Zhamu et al. | |
| 2011/0104576 | A1* | 5/2011 | Johnson et al. | 429/405 |

FOREIGN PATENT DOCUMENTS

EP 2270905 A1 1/2011

OTHER PUBLICATIONS

Paek et al. "Enhanced cyclic performance and lithium storage capacity of SnO2/graphene nanoporous electrodes with three-dimensionally delaminated flexible structure." Nano Letters vol. 9, No. 1, 72-75 (2009).*
Park and Ruoff. "Chemical Methods for the production of graphenes." Nature Nanotechnology vol. 4, 217-224 (2009).*
International Search Report and Written Opinion for International Application No. PCT/US2011/055910, International Filing Date Oct. 12, 2011, Date of Mailing May 12, 2012.
Wang, Caiyun, et al., "Electrochemical Properties of Graphene Paper Electrodes Used in Lithium Batteries," May 21, 2009, Chem. Mater, 2009, 2604-2606 pps., vol. 21, No. 13, American Chemical Society.
www.greencarcongress.com/2010/07/vorbeck-20100714; "Vorbeck Materials and PNNL to Collaborate to Develop Graphene Product for Li-ion Battery Electrodes; Potential for Rapid Recharge," Jul. 14, 2010, Green Car Congress.
Do, Inhwan, et al., "Nanosized Thin Graphene (NTG) Application for Energy Generation and Storage Devices—Supercapacitors," 1-4 pps., Paper, Michigan State University, 2010, downloaded on Nov. 12, 2010.

* cited by examiner

*Primary Examiner* — Milton I Cano
*Assistant Examiner* — Michael Dignan
(74) *Attorney, Agent, or Firm* — Allan C. Tuan

(57) ABSTRACT

Some batteries can exhibit greatly improved performance by utilizing electrodes having randomly arranged graphene nanosheets forming a network of channels defining continuous flow paths through the electrode. The network of channels can provide a diffusion pathway for the liquid electrolyte and/or for reactant gases. Metal-air batteries can benefit from such electrodes. In particular Li-air batteries show extremely high capacities, wherein the network of channels allow oxygen to diffuse through the electrode and mesopores in the electrode can store discharge products.

15 Claims, 6 Drawing Sheets

GRAPHENE-BASED BATTERY ELECTRODES HAVING CONTINUOUS FLOW PATHS

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Among all of the different electrochemical couples upon which energy storage devices can be based, metal-air systems can exhibit the largest theoretical specific energies. For example, a lithium-air system can exhibit a theoretical specific energy of 11,972 Wh/kg. However, electrochemical performance of metal-air batteries can depend greatly on many factors including the properties of the carbon-based air electrode. While various nanostructured carbon materials have been explored in attempts to improve metal-air energy storage devices, the practical capacity, specific energy and rate performance of such devices has not been sufficient for most energy storage applications. Accordingly, an improved metal-air energy storage device is needed.

SUMMARY

The present invention includes batteries having electrodes comprising graphene nanosheets and methods for forming such electrodes. In one embodiment, the air electrode of a metal-air battery is characterized by randomly arranged graphene nanosheets forming a network of channels defining continuous flow paths through the air electrode and by oxygen diffusing through the channels. Exemplary metals in the metal-air batteries can include, but are not limited to Zn, Na, Mg, Fe, Ca, or Al. Preferably, the metal comprises Li. The graphene nanosheets can on average be less than 1 µm in length, width, or both. In particular examples, the graphene nanosheets on average are less than 30 nm in length, width or both.

The air electrode can further comprise mesopores adjacent to the channels, wherein discharge product is stored in the mesopores. In some embodiments, the mesopore volume can be enhanced by mixing a highly mesoporous carbon material with the graphene nanosheets. Preferably, the carbon material itself has a mesopore volume greater than 1 cc/g. Storage of discharge products in the mesopores can minimize blockage of the channels to maintain flow paths for oxygen. Preferably, the channels can have an average diameter between 0.1 and 10 µm. In some instances, the graphene nanosheets can be modified to improve performance. For example, in one embodiment, the graphene nanosheets can be fluorinated and at least a portion of the electrode can comprise fluorinated graphene nanosheets ($CF_x$). In particular examples, x can be between 0.5 and 1.5. In another embodiment, a catalyst comprising a transition metal or a transition metal oxide can be deposited on surfaces of the electrode such as on the graphene nanosheets and/or on the mesopores.

Embodiments of the metal-air batteries described above and elsewhere herein can have a specific capacity greater than or equal to 5000 mAh/g active material (i.e., graphene/carbon).

In a particular embodiment of the present invention, a lithium-air battery has a specific capacity greater than or equal to 5000 mAh/g active material and has an air electrode comprising graphene. The air electrode comprises randomly arranged graphene nanosheets forming a network of channels defining continuous flow paths through the air electrode in which oxygen diffuses. The air electrode further comprises a carbon material mixed with the graphene nanosheets, wherein the carbon material has a mesopore volume greater than 1 cc/g. The air electrode can further comprise a transition metal or a transition metal oxide deposited as a catalyst on surfaces of the electrode, such as on the graphene nanosheets and/or on the mesopores. In preferred embodiments, the channels have an average diameter between 0.1 and 10 µm. Furthermore, at least a portion of the electrode can comprise fluorinated graphene nanosheets ($CF_x$).

While some aspects of the present invention are particularly applicable to metal-air batteries, the present invention is not necessarily limited to metal-air batteries. For example, some embodiments encompass metal batteries or metal-ion batteries. Other embodiments encompass batteries having a cathode comprising graphene and a liquid electrolyte. Similar to embodiments described elsewhere herein, the cathode is characterized by randomly arranged graphene nanosheets forming a network of channels. In the context of liquid electrolytes, the channels define continuous flow paths through the cathode for the liquid electrolyte. In one instance, the battery can have an anode comprising lithium. The anode can comprise lithium metal or lithium-based compounds. Exemplary lithium-based anodes can include, but are not limited to $LiC_6$, $Li_xSi$ (x=0.5 to 4.4), $Li_xSn$ (x=0.5 to 4.4), $Li_xSnO_2$, and $Li_xTiO_y$, and $Li_5Ti_4O_{12}$. In another example, the battery is an aqueous Li-air battery. In some embodiments, the graphene nanosheets can be less than 1 µm in length, width, or both. More particularly, the graphene nanosheets are less than 30 nm in length, width or both. In other embodiments, the graphene nanosheets are fluorinated and at least a portion of the electrode comprises fluorinated graphene ($CF_x$). In some instances, x can be between 0.5 and 1.5 and/or the batteries can be configured either as primary lithium batteries or as rechargeable lithium batteries.

In any of the embodiments utilizing liquid electrolytes, the electrolyte preferably comprises glymes, ethers, or both. Exemplary ethers and glymes include, but are not limited to, Triglyme, butyl glyme, tetra(ethylene glycol) dimethyl ether (i.e. Tetraglyme), di(ethylene glycol) dimethyl ether (i.e. Diglyme), and di(propylene glycol) dimethyl ether (i.e. diproglyme). Particular examples of electrolytes include Lithium bis(trifluoromethylsulfonyl)imide (LiTFSI) in tri(ethylene glycol) dimethyl ether (Triglyme) and LiTFSI in di(ethylene glycol) dibutyl ether (or Butyl diglyme). Most preferably, the electrolytes comprise solvents that form $Li_2O_2$ discharge products.

In a particular embodiment of the present invention, a lithium-based battery having a specific capacity greater than or equal to 8000 mAh/g graphene/carbon, comprises an electrode in which graphene nanosheets are randomly arranged to form a network of channels that define a continuous flow path for fluids through the electrode. A carbon material is mixed with the graphene nanosheets, wherein the carbon material has a mespore volume greater than 1 cc/g. An electrolyte in the battery comprises glymes, ethers, or both. While reaction products can often contain mixtures of compounds, in some preferred embodiments, a discharge product comprises $Li_2O_2$.

A method for forming the electrodes described herein can comprise the steps of dispersing graphene in water or other solvents and adding a binder to the dispersed graphene to form a mixture. The weight ratio of the graphene to the binder can range from 25:75 to 95:5. The mixture is then dried to remove the water or the other solvents and is formed under pressure into a desired shape. The final graphene loading is between 1 and 20 mg/cm². A conductive support is embedded into the electrode before, during, or after formation into the desired shape. In preferred embodiments, the final graphene loading is approximately 2 mg/cm².

Exemplary binders can include, but are not limited to, polytetrafluoroethylene (PTFE) in an emulsion or polyvinylidene fluoride (PVDF) dissolved in a solvent. Preferably, the ratio of the graphene to the binder is approximately 75:25.

Forming under pressure can comprise feeding the mixture into a roller, wherein the roller pressure ranges from 10 to 120 psi.

In some embodiments, a carbon material having a mesopore volume larger than 1 cc/g is added to the mixture. The ratio of graphene to carbon material can range from 100:0 to 5:95. Preferably, the ratio of graphene to carbon material is approximately 50:50. In other embodiments, a catalyst comprising transition metals or transition metal oxides can be deposited on surfaces or pores of carbon materials in the electrode.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
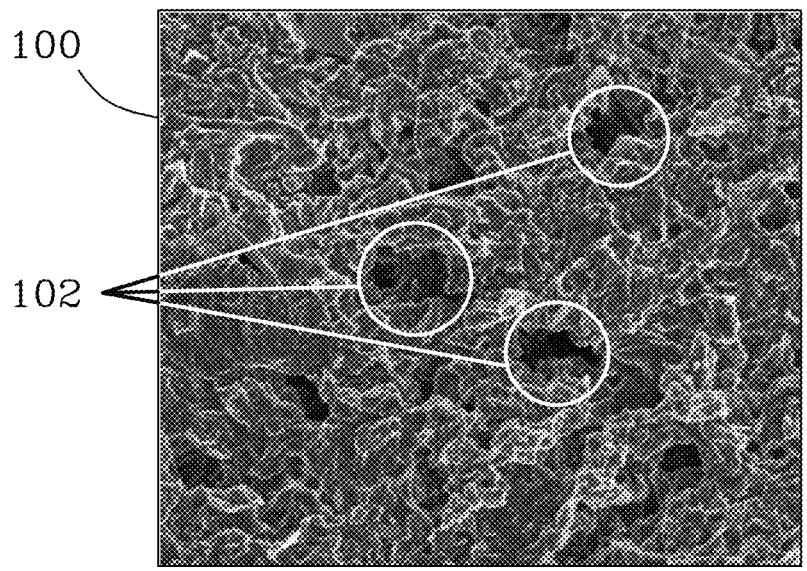
FIG. 1 contains scanning electron microscope (SEM) micrographs of a graphene-based electrode encompassed by embodiments of the present invention.
Figure 1:
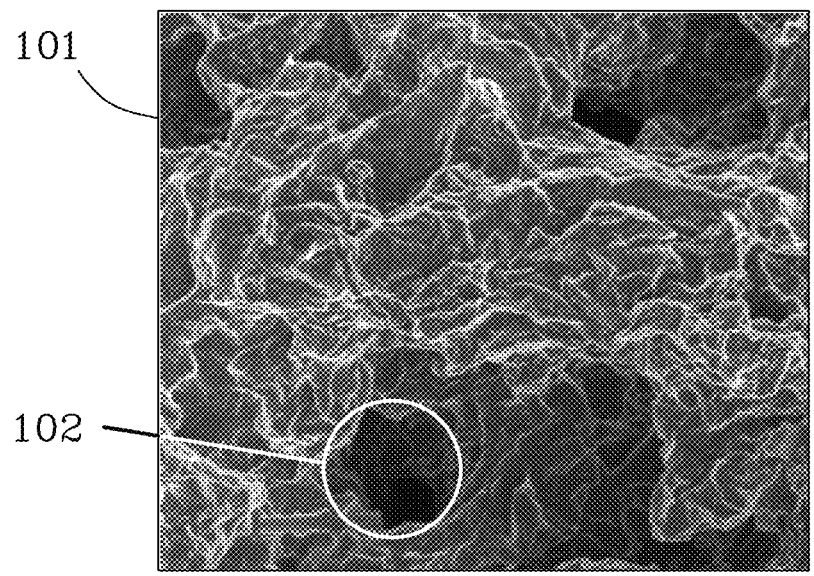

FIGS. 1-6 show a variety of aspects and embodiments of the present invention. Referring first to FIG. 1, scanning electron microscope (SEM) micrographs of an electrode comprising randomly arranged graphene nanosheets are shown at two different magnifications 100 and 101. The random distribution of graphene nanosheets, according to embodiments of the present invention, leads to the formation of a significant network of channels 102. The channels define continuous flow paths through the electrode.

In one example, wherein the battery is a metal-air battery, the network of channels formed by the random distribution of graphene nanosheets can continuously supply oxygen to the interior of air electrode during the discharge process. Unlike the engineered holes or pores in other carbon-based air electrodes, which can expand back after being wetted by an electrolyte, the channels formed by the graphene nanosheets in embodiments of the present invention maintain their structure.

Graphene, as used herein, can refer to a material comprising stacks of single-atom-thick sheets of conjugated $sp^2$ carbon atoms typically having a wide open double-sided surface. However, traditional graphene does not have intrinsic pores and has a relatively low surface area. It has, therefore, not been considered to be a good candidate for use in various applications including air electrodes. The random arrangement of graphene nanosheets utilized by embodiments of the present invention forms a network of channels providing continuous flow paths for oxygen and/or liquid electrolyte. Furthermore, discharge products can be stored in the channels and/or in the mesopores adjacent to the channels.

Figure 2A:
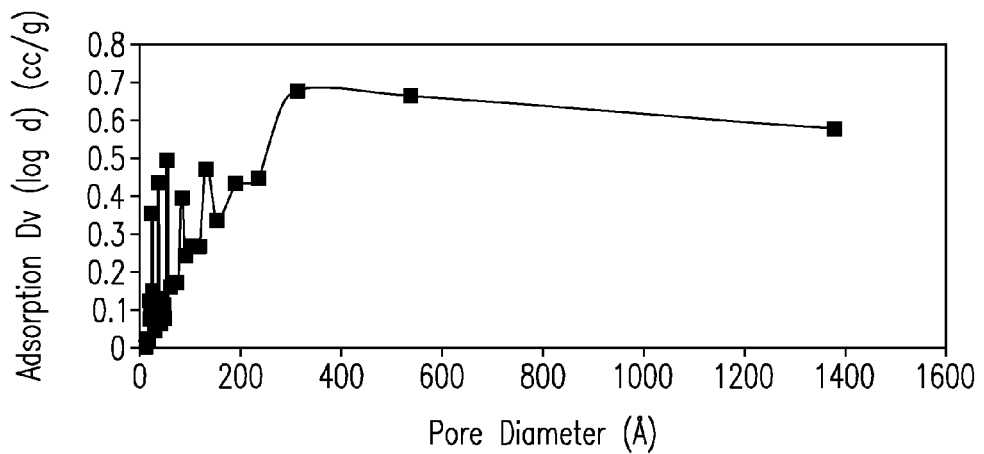
FIGS. 2a and 2b compare pore size distributions of as-received graphene and a graphene-based electrode encompassed by embodiments of the present invention.
Figure 2B:
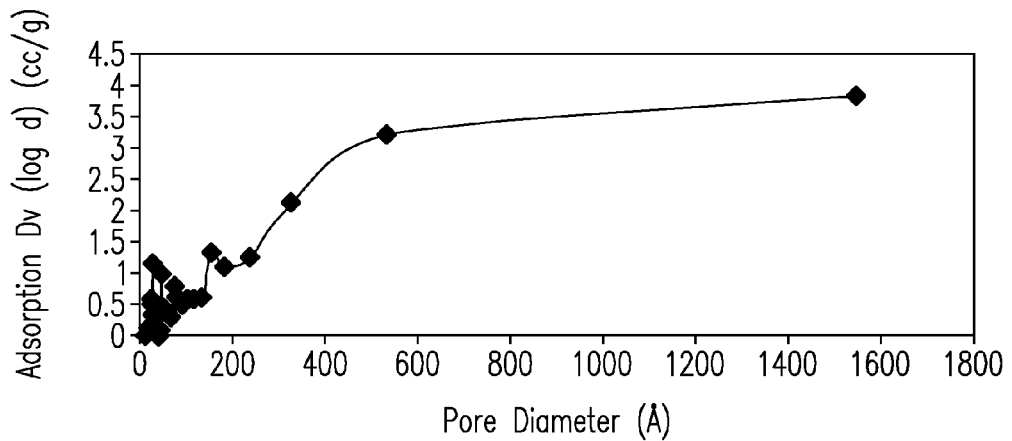

Referring to FIGS. 2a and 2b, pore size distributions are provided for the graphene-based electrodes formed according to embodiments of the present invention and for as-received graphene, respectively. There are no peaks in either figure, which can indicate that neither the as-received graphene nor the graphene air electrode have substantial porous structures. The average "pore" sizes (shown in Table 1) calculated from FIGS. 2a and 2b are 27.1 nm and 18.1 ran for the as-received graphene and the graphene-based air electrode, respectively.

TABLE 1

Comparison of the physical properties for as-received graphene and graphene electrode

| | BET Surface Area (m²/g) | Pore Volume (cc/g) | Average Pore Size (nm) |
|---|---|---|---|
| As-received graphene | 590.3 | 4.0 | 27.1 |
| Graphene-based air Electrode | 186.2 | 0.84 | 18.1 |

The pore volume and surface area decrease significantly after being made into an electrode according to methods of the present invention. In part, this is probably due to the addition of a binder.

Comparing the physical properties summarized in Table 1 and in FIG. 2 with the micrographs in FIG. 1, it is most likely that the pore size, pore volume, and surface area data represents the average size of the open channels which are residing in the meso-pore range suitable for the formation of tri-phase regions. Since there appear to be fewer and smaller pores in the graphene-based air electrode (relative to as-received graphene), the improvement in performance is most likely explained by the formation of the network of channels through the random arrangement of graphene nanosheets, which define flow paths through the electrode. The natural folding areas and the inter-layer spaces between the graphene nanosheets as shown in FIG. 1 result in externally formed channels that can be utilized as flow paths and/or as storage places for discharge products.

Figure 3:
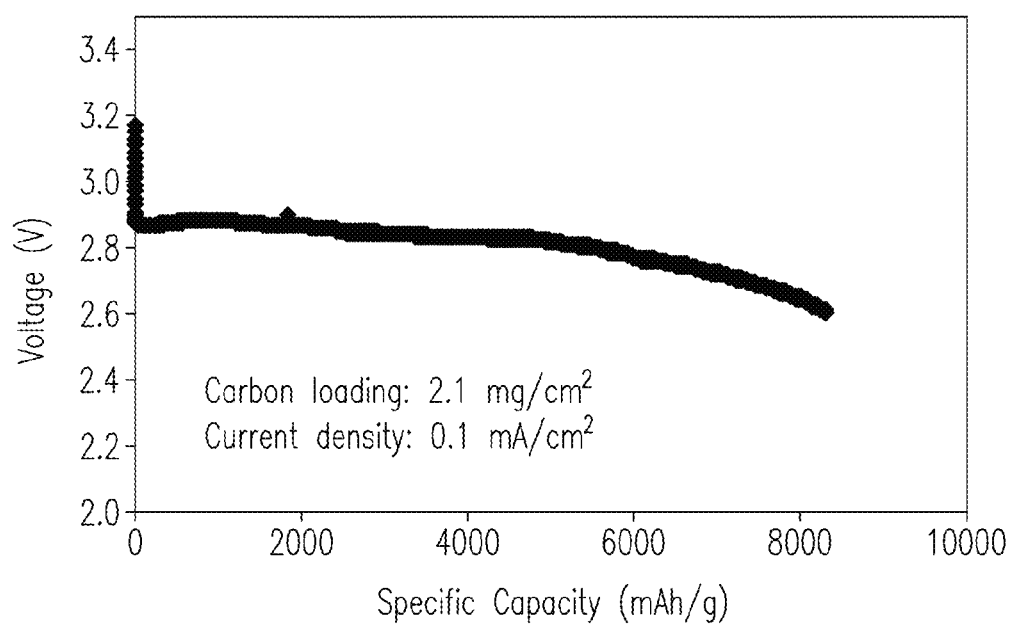
FIG. 3 presents a discharge curve of a Li-air cell utilizing a graphene-based air electrode encompassed by embodiments of the present invention.

FIG. 3 is a graph of the discharge curve for a Li-air battery using a graphene-based air electrode according to embodiments of the present invention. The cell was tested in pure oxygen (~2 atm) at a current density of 0.1 mA/cm$^2$. A very high capacity of greater than 8000 mAh/g is achieved when discharged to 2.6 V. A relatively flat plateau is observed at around 2.8 V similar with other air electrodes using different carbons.

Figure 4A:
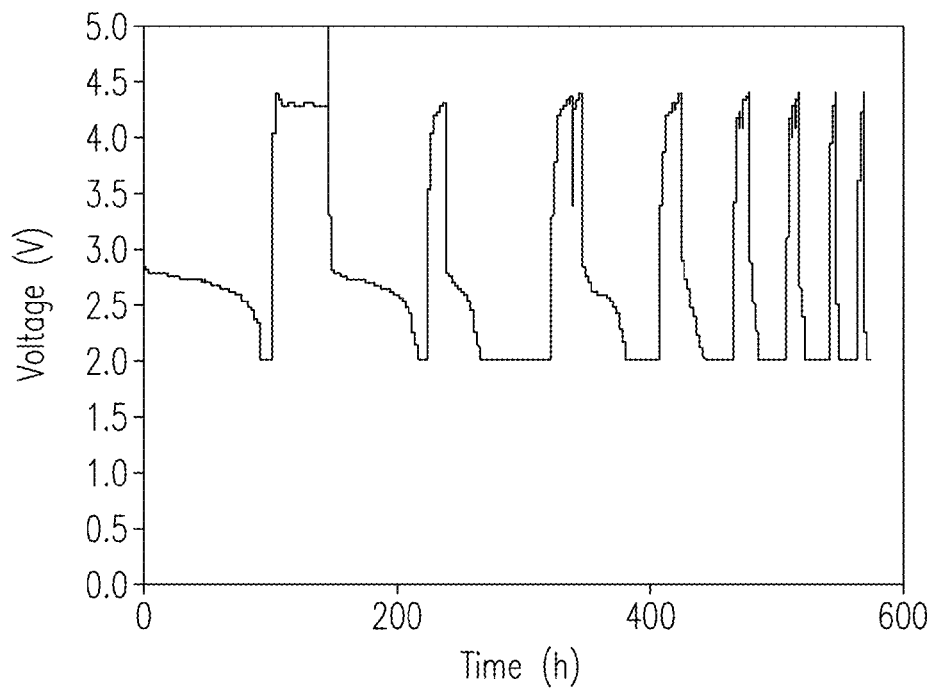
FIGS. 4a and 4b present and compare cycling data for one embodiment of a graphene-based Li-air battery and a Ketjenblack-based Li-air battery.
Figure 4B:
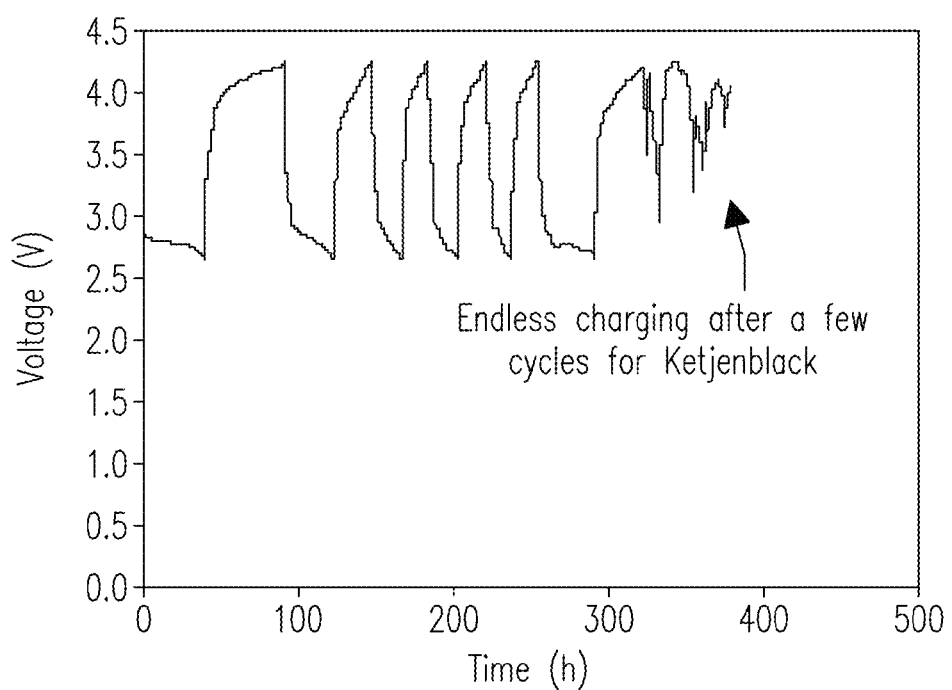

The recharge-ability of the Li-air battery using a graphene-based air electrode is plotted in FIG. 4a. The data shown in FIG. 4a indicates that the graphene-based air electrode is rechargeable. Other carbon-based air electrodes with highly porous structures usually have a high surface area (2672 m$^2$/g for Ketjenblack as an example) which can lead to significant decomposition of the organic electrolyte during the charge process. For comparison with FIG. 4a, the rechargeability of a common Li-air battery using Ketjenblack-based air electrode is plotted in FIG. 4b. After 5 cycles the voltage of the Ketjenblack-based Li-air cell shows unstable fluctuation related to electrolyte decomposition. In contrast, the embodiments of the graphene-based air electrodes described herein exhibit a relatively low surface area of 590.3 m$^2$/g (Table 1). The limited surface area appears to result in reduced electrolyte decomposition on the surface of graphene nanosheets at voltages higher than 4.2 V. In some embodiments, a transition metal or transition metal catalyst deposited on the graphene nanosheets can further improve the cycling stability and to reduce the over potential during charge processes.

Figure 5A:
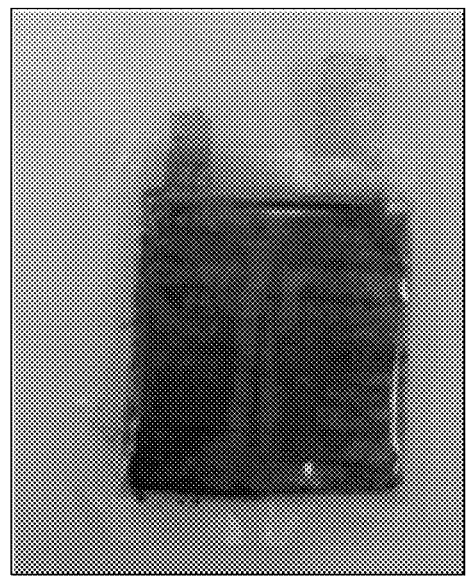
FIG. 5 includes a photograph of a Li-air pouch cell used for testing as well as the voltage profile of the pouch cell.
Figure 5B:
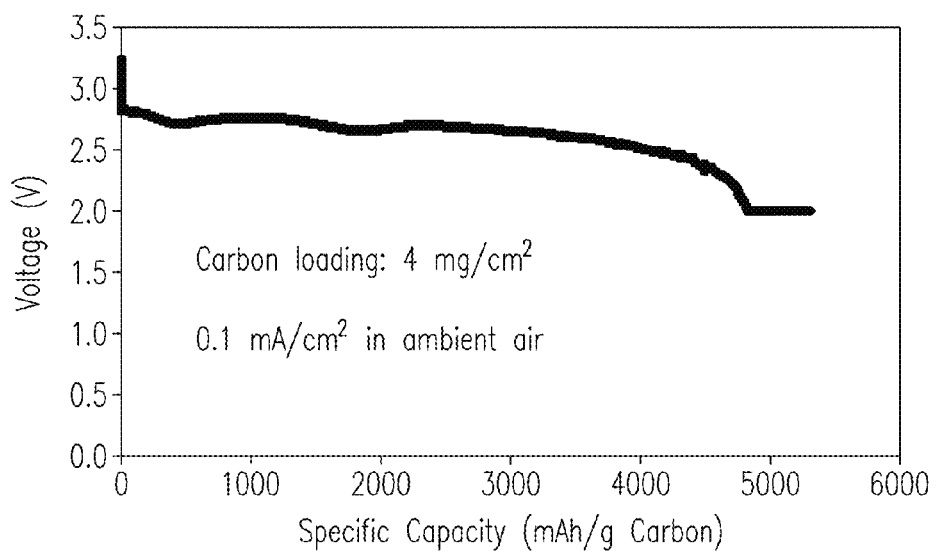

The tests described above were performed in a pure oxygen atmosphere. In order to evaluate the performance of the embodiments of the graphene-based air electrode in an ambient environment, a pouch-type cell was prepared as illustrated in FIG. 5a. The size of the air electrode was 2×2 cm$^2$ with a carbon loading of 4 mg/cm$^2$. FIG. 5b shows the discharge curve of the pouch-type Li-air battery using graphene-based air electrodes when operated in ambient conditions. A stable plateau is observed between 2.7-2.8 V and the discharge capacity was 5093 mAh/g carbon at 0.1 mA/cm$^2$ in the ambient environment.

Figure 6:
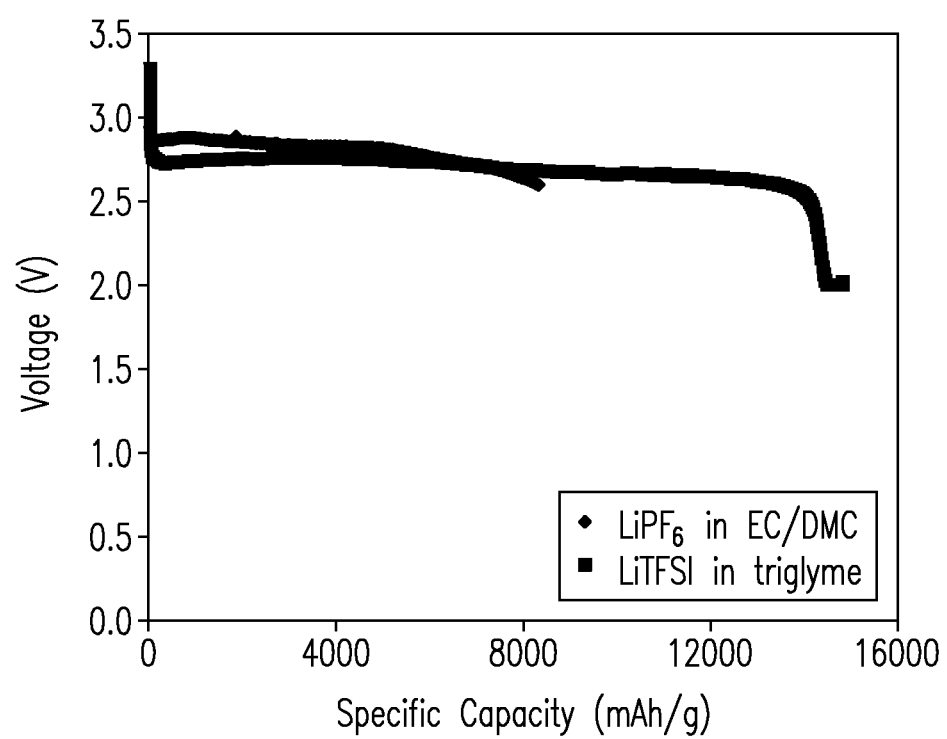
FIG. 6 includes a graph showing specific capacity of a Li-air cell using an electrolyte comprising LiTFSI in Triglyme.

Referring to FIG. 6, embodiments of the present invention utilizing electrolytes comprising glymes, ethers, or both can result in specific capacities exceeding approximately 15,000 mAh/g. The data provided in FIG. 6 was acquired on a Li-air cell having an electrode with randomly arranged graphene nanosheets, as described elsewhere herein, in conjunction with an electrolyte comprising lithium bis(trifluoromethylsulfonyl)imide (LiTFSI) in tri(ethylene glycol) dimethyl ether (Triglyme). Alternative electrolytes can include those that comprise Triglyme, butyl glyme, tetra(ethylene glycol) dimethyl ether (i.e. Tetraglyme), di(ethylene glycol) dimethyl ether (i.e. Diglyme), and di(propylene glycol) dimethyl ether (i.e. diproglyme). Another particular example of an electrolyte includes LiTFSI in dimethylene glycol) dibutyl ether (or Butyl diglyme). Generally speaking, it is preferable to utilize an electrolyte that is stable and yields $Li_2O_2$ during the discharge process of Li-air batteries X-Ray Diffraction (XRD) patterns (data not shown) indicate that both LiTFSI in Triglyme and LiTFSI in butyl diglyme can result in discharge products comprising $Li_2O_2$. Further still, the liquid electrolyte can comprise compounds such as Lithium bis(trifluoromethylsulfonyl)imide (LiTFSI), lithium bis(oxaiate)borate (LiBOB), $LiPF_6$, $LiBF_4$, $LiAsF_6$. Exemplary solvents in addition to those listed elsewhere herein, can include, but are not limited to, ethylene carbonate (EC), propylene carbonate (PC), dimethyl ether (DME) solvent, diethylene carbonate (DEC), ethyl methyl carbonate (EMC), and combinations thereof.

One of several available methods for making the graphene-based electrodes described elsewhere herein includes mixing dispersed graphene nanosheets with a binder and then forming them into electrodes. For example, as-received graphene can be dispersed in de-ionized water or other organic solvent and stirred. A PTFE emulsion (60% solids) can be added drop by drop into the graphene dispersion while stirring. The weight ratio of graphene to PTFE can be between 25:75 and 95:5. Preferably, the ratio is approximately 75:25.

The graphene and PTFE mixture can be stirred for an additional two hours and then dried in air at 80° C. overnight. The resultant powder mixture can be fed into a roller having a roller pressure between 10 and 120 psi. Preferably, the pressure is approximately 80 psi. The final loading in the rolled powder can be between 1 and 10 mg graphene/cm$^2$. Preferably, the loading is approximately 2 mg graphene/cm$^2$.

A conductive support, which can include, but is not limited to a nickel mesh or aluminum mesh can be embedded into the rolled graphene. The electrode can then be punched directly from rolled graphene into a desired shape and size.

In some embodiments, the graphene can be mixed with other mesoporous carbons such as Ketjenblack to improve the mesopore volume of the whole electrode. Preferably, the mesoporous carbons have a mesopore volume larger than 1 cc/cm$^3$. The mixture of the randomly arranged graphene with the mesoporous carbon can provide both the network of channels as well as increased porosity for improved storage of reaction products. Exemplary reaction products in Li-air batteries can include $Li_2O_2$ and $Li_2O$. The ratio of graphene to other mesoporous carbons can vary from 100:0 to 5:95, preferably 50:50.

Furthermore, different catalysts such as Pt, Pd, Au, Cu, Ag, $V_2O_5$, $Fe_3O_4$, $Cr_2O_3$, $MnO_2$, $Co_3O_4$, NiO can be deposited on the graphene nanosheets homogeneously to promote oxidation reactions such as $Li_2O_2$ in Li-air batteries or ZnO in Zinc-air batteries. One method for catalyst deposition includes self-assembly.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A metal-air battery having a specific capacity greater than or equal to 5000 mAh/g graphene/carbon and having a metal electrode comprising Li and an air electrode comprising graphene, the air electrode comprising randomly arranged graphene nanosheets forming a network of channels defining continuous flow paths through the air electrode and by oxygen diffusing through the channels.

2. The metal-air battery of claim 1, wherein at least a portion of the air electrode comprises fluorinated graphene nanosheets ($CF_x$, where $0.5<x<1.5$).

3. The metal-air battery of claim 1, wherein the air electrode further comprises a catalyst deposited on surfaces of the electrode, the catalyst comprising a transition metal or transition metal oxide.

4. The metal-air battery of claim 1, wherein the channels have average diameters between 0.1 and 10 μm.

5. The metal-air battery of claim 1, further comprising an electrolyte comprising ethers, glymes, or combinations thereof, wherein the electrolyte comprises lithium bis(trifluoromethylsulfonyl)imide (LiTFSI) in tri(ethylene glycol) dimethyl ether otherwise known as triglyme.

6. The metal-air battery of claim 1, further comprising an electrolyte comprising ethers, glymes, or combinations thereof, wherein the electrolyte comprises LiTFSI in di(ethylene glycol) dibutyl ether otherwise known as butyl digylme.

7. The metal-air battery of claim 1, further comprising discharge product stored in mesopores adjacent to the channels.

8. A lithium-air battery having a specific capacity greater than or equal to 5000 mAh/g graphene/carbon and having an air electrode comprising graphene, the air electrode comprising randomly arranged graphene nanosheets forming a network of channels defining continuous flow paths through the air electrode, oxygen diffusing through the channels, and a carbon material mixed with the graphene nanosheets, the carbon material having a mesopore volume greater than 1 cc/g.

9. The lithium-air battery of claim 8, wherein the air electrode further comprises a catalyst deposited on surfaces of the electrode, the catalyst comprising a transition metal or transition metal oxide.

10. The lithium-air battery of claim 8, wherein the channels have average diameters between 0.1 and 5 μm.

11. The lithium-air battery of claim 8, wherein at least a portion of the air electrode comprises fluorinated graphene nanosheets ($CF_x$, where $0.5<x<1.5$).

12. The lithium-air battery of claim 8, further comprising an electrolyte comprising ethers, glymes, or combinations thereof.

13. The lithium-air battery of claim 12, wherein the electrolyte comprises lithium bis(trifluoromethylsulfonyl)imide (LiTFSI) in tri(ethylene glycol) dimethyl ether (triglyme).

14. The lithium-air battery of claim 12, wherein the electrolyte comprises LiTFSI in di(ethylene glycol) dibutyl ether (or butyl diglyme).

15. A lithium-based battery having a specific capacity greater than or equal to 8000 mAh/g graphene/carbon and having an electrode comprising graphene, the electrode comprising randomly arranged graphene nanosheets forming a network of channels defining continuous flow paths for fluids through the electrode, a carbon material mixed with the graphene nanosheets, the carbon material having a mesopore volume greater than 1 cc/g, and an electrolyte comprising glymes, ethers, or both.

* * * * *